United States Patent [19]

Nakamura et al.

[11] Patent Number: 5,851,653
[45] Date of Patent: Dec. 22, 1998

[54] TRANSPARENT BRITTLE FILM

[75] Inventors: Masahiro Nakamura, Saitamaken; Etsuo Matsui, Yamanashiken, both of Japan

[73] Assignees: Lintec Corporation; Asahi Kagaku Kogyo Co., Ltd., both of Tokyo, Japan

[21] Appl. No.: 769,069

[22] Filed: Dec. 18, 1996

[30] Foreign Application Priority Data

Jan. 11, 1996 [JP] Japan ................................ 8-020451

[51] Int. Cl.⁶ ........................................................ B32B 5/16
[52] U.S. Cl. .................. 428/328; 427/335; 427/372.2; 428/329; 428/330; 428/331; 428/336; 428/338; 428/340
[58] Field of Search ..................... 428/328, 329, 428/330, 331, 336, 338, 340; 427/331, 335, 372.2

[56] References Cited

U.S. PATENT DOCUMENTS

| | | | |
|---|---|---|---|
| 4,247,663 | 1/1981 | Yoshiga et al. | 525/227 |
| 5,011,660 | 4/1991 | Arena | 422/22 |
| 5,051,298 | 9/1991 | Landry et al. | 428/220 |

FOREIGN PATENT DOCUMENTS

| | | |
|---|---|---|
| 0 192 961 | 9/1986 | European Pat. Off. . |
| 54-34420 | 10/1979 | Japan . |
| 60-64812 | 4/1985 | Japan . |
| 64-79237 | 3/1989 | Japan . |

*Primary Examiner*—H. Thi Le
*Attorney, Agent, or Firm*—Frishauf, Holtz, Goodman, Langer & Chick, P.C.

[57] ABSTRACT

A transparent brittle film prepared from a resin composition comprising (A) 100 parts by weight of a vinyl chloride resin, (B) 20 to 200 parts by weight of an acrylic resin, (C) 20 to 250 parts by weight of fused silica comprising aggregates of particles having an average particle diameter in the range of 5 to 20 $\mu$m and individual particle diameters in the range of 0.5 to 100 $\mu$m or aluminum hydroxide or barium sulfate comprising aggregates of particles having an average particle diameter in the range of 1 to 20 $\mu$m and individual particle diameters in the range of 0.2 to 50 $\mu$m, (D) 0 to 40 parts by weight of a plasticizer, and (E) 0.5 to 10 parts by weight of a stabilizer. The film is brittle, easily torn, and transparent, has a suitable degree of flexibility and hardness, and can be produced inexpensively and easily.

15 Claims, No Drawings

TRANSPARENT BRITTLE FILM

FIELD OF THE INVENTION

The present invention relates to a novel transparent brittle film. More particularly, the present invention relates to a transparent brittle film which is transparent, brittle, easily torn, and advantageously used for application as labels and stickers, such as certificate stamps and sealing labels, and display stickers, such as marks for danger prevention and marks for commercial products.

PRIOR ART OF THE INVENTION

Brittle films have heretofore been used as labels which must be prevented from transfer, such as labels for theft prevention and labels of certificate stamps, by taking advantage of the property which is brittle and easily torn.

As the brittle film used for the above applications, various films, such as (1) a brittle film for marking which has a thickness of about 30 to 60 $\mu$m and comprises a resin composition containing 100 parts by weight of a vinyl chloride resin, about 5 to 20 parts by weight of an alkyl methacrylate resin, 5 to 30 parts by weight of a plasticizer, and pigments (Japanese Patent Publication No. Showa 54(1979)-34420), (2) a substantially transparent sheet having a layer composed of glass microspheres alone and having a refractive index of 1.8 or more (Japanese Patent Application Laid-Open No. Showa 50(1975)-129195), and (3) a safety label using the above transparent sheet as the brittle film which is brittle and easily torn (Japanese Patent Publication No. Showa 61(1986)-47426), have been proposed.

However, because (1) the above brittle film for marking is colored by using pigments, this film has drawbacks in that particular information placed under the film cannot be observed and recognized through the film, and that the film has insufficient brittleness, poor flexibility, and inferior fitting for attaching to curved surfaces.

(2) The above transparent sheet and (3) the above safety label using the transparent sheet have drawbacks in that the sheet and the label are inevitably expensive because expensive glass microspheres are used and that complicated procedures are required for uniformly arranging the glass microspheres into a layer by using the glass spheres alone.

A transparent brittle film having a total light transmittance of 30% or more which is prepared from a composition containing 100 parts by weight of a vinyl chloride resin and 80 to 250 parts by weight of a material which is incompatible with the vinyl chloride resin, has an average particle size of $10\mu$ or less, and has a refractive index of 1.7 or less is also proposed (Japanese Patent Application Laid-Open No. Showa 64(1989)-79237). However, because this transparent brittle film contains the vinyl chloride resin alone as the resin component, this film has a drawback in that formation of a film is difficult unless a large amount of a plasticizer, such as about 20 to 80 parts by weight of a plasticizer per 100 parts by weight of the vinyl chloride resin, is contained (35 parts by weight of a plasticizer was contained in the example), and this causes the problem that the hardness and the brittleness of the film are not always always satisfactory.

SUMMARY OF THE INVENTION

Accordingly, the present invention has an object of overcoming the drawbacks of conventional brittle films and providing a transparent brittle film which is brittle, easily torn, and transparent, has a suitable degree of flexibility and hardness, and can be produced inexpensively and easily.

As the result of the extensive studies conducted by the present inventors to develop a transparent brittle film having the above desirable properties, it has been discovered that the above object can be achieved by a film prepared from a resin composition comprising a vinyl chloride resin, an acrylic resin, a specific filler having an average particle diameter and individual particle diameters in specific ranges, a plasticizer, and a stabilizer, each in specific relative amounts. The present invention has been completed on the basis of the discovery.

Thus, the present invention provides:

(1) A transparent brittle film prepared from a resin composition comprising (A) 100 parts by weight of a vinyl chloride resin, (B) 20 to 200 parts by weight of an acrylic resin, (C) 20 to 250 parts by weight of at least one type of filler selected from the group consisting of (a) fused silica comprising aggregates of particles having an average particle diameter in the range of 5 to 20 $\mu$m and individual particle diameters in the range of 0.5 to 100 $\mu$m, (b) aluminum hydroxide comprising aggregates of particles having an average particle diameter in the range of 1 to 20 $\mu$m and individual particle diameters in the range of 0.2 to 50 $\mu$m, and (c) barium sulfate comprising aggregates of particles having an average particle diameter in the range of 1 to 20 $\mu$m and individual particle diameters in the range of 0.2 to 50 $\mu$m, (D) 0 to 40 parts by weight of a plasticizer, and (E) 0.5 to 10 parts by weight of a stabilizer.

The preferred embodiments of the present invention include:

(2) A transparent brittle film described in (1) wherein the film has a light transmittance of 20% or more in a range of wave length of 300 to 700 nm and a tearing strength of 3.0 to 20.0 g;

(3) A transparent brittle film described in any of (1) and (2) wherein the film has a tensile strength at break of 1.0 to 3.0 kg/mm$^2$ and an elongation at break of 2.0 to 10.0%;

(4) A transparent brittle film described in any of (1) to (3) wherein the film has a thickness of 20 to 100 $\mu$m; and (5) A transparent brittle film described in any of (1) to (4) wherein the film is prepared in accordance with an organosol coating process.

DETAILED DESCRIPTION OF THE INVENTION

As the vinyl chloride resin used as component (A) in the film of the present invention, homopolymer of vinyl chloride and copolymers of vinyl chloride containing vinyl chloride as the main component thereof can be used. Examples of the comonomer used in the copolymer include vinyl esters, vinyl ethers, acrylic acid, methacrylic acid, esters of acrylic acid, esters of methacrylic acid, maleic acid, fumaric acid, esters of maleic acid, esters of fumaric acid, maleic anhydride, aromatic vinyl compounds, halogenated vinylidene compounds, acrylonitrile, methacrylonitrile, and α-olefins, such as ethylene and propylene. The comonomer may be used singly or as a combination of two or more types. The copolymer may be crosslinked by using a small amount of a polyfunctional monomer.

The process for preparation of the vinyl chloride resin is not particularly limited, and any process for polymerization, such as the emulsion polymerization, the seeded emulsion polymerization, the fine suspension polymerization, and the suspension polymerization, may be used. It is preferred that the vinyl chloride resin has an average diameter of single particles of 0.2 to 5 $\mu$m so that the resin is dispersed in a plasticizer or the like material to form a sol. The vinyl chloride resin may also partially contain components having an average particle diameter of 10 to 40 μm. It is preferred that the vinyl chloride resin has an average degree of polymerization (measured in accordance with the method of Japanese Industrial Standard K 6721) of 800 to 2500.

In the present invention, a single type or a combination of two or more types of the vinyl chloride resin may be used as component (A).

In the film of the present invention, the acrylic resin used as component (B) plays the role of decreasing the content of plasticizers, improving the property of the used organosol for forming a film in the preparation process of a film described later, and providing excellent transparency and a suitable degree of hardness and brittleness to the obtained film. Examples of the acrylic resin include homopolymers of alkyl esters of (meth)acrylic acid, such as methyl (meth)acrylate, ethyl (meth)acrylate, propyl (meth)acrylate, butyl (meth)acrylate, amyl (meth)acrylate, hexyl (meth)acrylate, and cyclohexyl (meth)acrylate; copolymers obtained from combinations of two or more types of these monomers; and copolymers obtained from these monomers and (meth)acrylic acid, styrene, vinyltoluene, (meth)acrylonitrile, (meth)acrylamide, or vinyl chloride. Among these acrylic resins, soft resins are not preferable in view of the brittleness of the obtained film. In view of the physical properties of the obtained film, the particularly preferable acrylic resins are copolymers of methyl methacrylate and methyl acrylate and polymethyl methacrylate.

In the present invention, a single type or a combination of two or more types of the acrylic resin may be used as component (B). The content of the acrylic resin is selected in the range of 20 to 200 parts by weight per 100 parts by weight of the above vinyl chloride resin of component (A). When the content is less than 20 parts by weight, the property of the organosol for forming a film is inferior, and it is difficult to obtain a film having excellent transparency and a suitable degree of hardness and brittleness. When the content is more than 200 parts by weight, a film having the desired physical properties cannot be obtained. In view of the property of the organosol for forming a film and the physical properties of the film, the content of the acrylic resin is preferably in the range of 40 to 160 parts by weight, more preferably in the range of 60 to 140 parts by weight, per 100 parts by weight of the vinyl chloride resin.

In the film of the present invention, the filler used as component (C) plays the role of maintaining transparency of the obtained film and providing brittleness to the obtained film. As the filler, fused silica, aluminum hydroxide, barium sulfate, or a mixture of these materials can be used. In the present invention, it is necessary that fused silica, among these fillers, comprise aggregates of particles having an average particle diameter in the range of 5 to 20 μm and individual particle diameters in the range of 0.5 to 100 μm. When the average particle diameter is less than 5 μm, the dispersion of the fused silica in the organosol is inferior, and there is the possibility that the transparency of the film is decreased. When the average particle diameter is more than 20 μm, the smoothness of the surface of the film is inferior. When fused silica contains a large amount of particles having a diameter of less than 0.5 μm, the dispersion of the fused silica in the organosol is inferior, and the organosol tends to have a high viscosity. When fused silica contains a large amount of particles having a diameter of more than 100 μm, a film having a coarse surface is obtained. In view of the dispersion in the organosol, the viscosity of the organosol, and the transparency and the smoothness of the film, it is preferred that fused silica comprises aggregates of particles having an average particle diameter in the above range and individual particle diameters in the range of 1 to 70 μm. Fused silica having a broader distribution of the particle diameter is preferable.

It is necessary that aluminum hydroxide and barium sulfate comprise aggregates of particles having an average particle diameter in the range of 1 to 20 μm and individual particle diameters in the range of 0.2 to 50 μm. When the average particle diameter is less than 1 μm, the dispersion in the organosol is inferior, and there is the possibility that the transparency of the film is decreased. When the average particle diameter is more than 20 μm, the smoothness of the surface of the film is inferior. When aluminum hydroxide or barium sulfate contains a large amount of particles having a diameter of less than 0.2 μm, the aluminum hydroxide or the barium sulfate shows poor dispersion in the organosol, and the organosol tends to have a high viscosity. When aluminum hydroxide or barium sulfate contains a large amount of particles having a diameter of 50 μm, a film having a coarse surface is obtained. In view of the dispersion in the organosol, the viscosity of the organosol, and the transparency and the smoothness of the film, it is preferred that aluminum hydroxide and barium sulfate comprise aggregates of particles having an average particle diameter in the above range and individual particle diameters in the range of 0.7 to 30 μm. In the present invention, the particle diameter of the vinyl chloride resin of component (A) and the filler of component (C) is measured by the precipitation turbidimetry.

In the present invention, the content of the filler is selected in the range of 20 to 250 parts by weight per 100 parts by weight of the vinyl chloride resin of component (A). When the content is less than 20 parts by weight, brittleness of the film is insufficient. When the content is more than 250 parts by weight, transparency of the film is decreased, and the film becomes excessively brittle to cause decrease in the property for handling. In view of the transparency, the brittleness, and the property for handling, the content of the filler is preferably 40 to 200 parts by weight, more preferably 60 to 140 parts by weight, per 100 parts by weight of the vinyl chloride resin.

In the film of the present invention, the plasticizer used as component (D) is not particularly limited, and a plasticizer is selected from plasticizers conventionally used for vinyl chloride resins as desired. Examples of the plasticizer include derivatives of phthalic acid, such as dimethyl phthalate, diethyl phthalate, di-(2-ethylhexyl) phthalate, di-n-octyl phthalate, diisobutyl phthalate, diisononyl phthalate, diphenyl phthalate, diisodecyl phthalate, ditridecyl phthalate, diundecyl phthalate, dibenzyl phthalate, butyl benzyl phthalate, dinonyl phthalate, and dicylohexyl phthalate; derivatives of isophthalic acid, such as dimethyl isophthalate, di-(2-ethylhexyl) isophthalate, and diisooctyl isophthalate; derivatives of tetrahydrophthalic acid, such as di-(2-ethylhexl) tetrahydrophthalate, di-n-octyl tetrahydrophthalate, and diisodecyl tetrahydrophthalate; derivatives of adipic acid, such as di-n-butyl adipate, di-(2-ethylhexyl) adipate, diisodecyl adipate, and diisononyl adipate; derivatives of azelaic acid, such as di-(2-ethylhexyl) azelate, diisooctyl azelate, and di-n-hexyl azelate; derivatives of maleic acid, such as di-n-butyl maleate, dimethyl maleate, diethyl maleate, and di-(2-ethylhexl) maleate; derivatives of fumaric acid, such as di-n-butyl fumarate and di-(2-ethylhexyl) fumarate; derivatives of trimellitic acid, such as tri-(2-ethylhexyl) trimellitate, tri-n-octyl trimellitate, triisodecyl trimellitate, triisooctyl trimellitate, tri-n-hexyl trimellitate, and triisononyl trimellitate; derivatives of pyromellitic acid, such as tetra-(2-ethylhexl) pyromellitate and tetra-n-octyl pyromellitate; derivatives of citric acid, such as triethyl citrate, tri-n-butyl citrate, and acetyl triethyl citrate; derivatives of itaconate, such as monomethyl itaconate, monobutyl itaconate, dimethyl itaconate, diethyl itaconate, dibutyl itaconate, and di-(2-ethylhexyl) itaconate; derivatives of oleic acid, such as butyl oleate, glyceryl monooleate, and diethylene glycol monooleate; derivatives of ricinolic acid, such as methyl acetyl ricinolate, butyl acetyl ricinolate, glyceryl monoricinolate, and diethylene glycol monoricinolate; derivatives of stearic acid, such as n-butyl stearate, glycerol monostearate and diethylene glycol distearate; derivatives of other fatty acids, such as diethylene glycol monolaurate, diethylene glycol diperalgonate, and fatty acid esters of pentaerythritol; derivatives of phosphoric acid, such as triethyl phosphate, tributyl phosphate, tris(chloroethyl) phosphate, and tricresyl phosphate; derivatives of glycol, such as diethylene glycol dibenzoate, dipropylene glycol dibenzoate, triethylene glycol dibenzoate, triethylene glycol di-(2-ethylbutyrate), triethylene glycol di-(2-ethylhexoate), and dibutyl methylenebisthioglycolate; derivatives of glycerol, such as glycerol monoacetate, glycerol triacetate, and glycerol tributyrate; epoxy derivatives, such as epoxidized soy bean oil, epoxybutyl stearate, di-(2-ethylhexyl) epoxyhexahydrophthalate, diisodecyl epoxyhexahydrophthalate, epoxytriglyceride, epoxidized octyl oleate, and epoxidized decyl oleate; and polyester plasticizers, such as polyesters derived from adipic acid, polyesters derived from cebacic acid, and polyesters derived from phthalic acid.

In the present invention, a single type or a combination of two or more types of the plasticizer may be used. The content is selected in the range of 0 to 40 parts by weight per 100 parts by weight of the vinyl chloride resin of component (A). When the content is more than 40 parts by weight, the film is excessively soft to cause decrease in the brittleness, and the object of the present invention is not achieved. In view of the property of the organosol for forming a film and the suitable degree of flexibility and brittleness of the film, the content of the plasticizer is preferably in the range of 10 to 30 parts by weight per 100 parts by weight of the vinyl chloride resin.

In the film of the present invention, the stabilizer used as component (E) is not particularly limited, and can be selected from stabilizers conventionally used as a heat stabilizer for a vinyl chloride resin as desired. Examples of the stabilizer include metal soaps, such as magnesium stearate, aluminum stearate, calcium stearate, barium stearate, zinc stearate, calcium laurate, barium laurate, and zinc laurate; metal salts, such as sodium salt, zinc salt, and barium salt, of phenol and naphthol; organotin compounds, such as dibutyltin dilaurate and dibutyltin dimaleate; and esters of phosphorous acid, such as diethyl phosphite, dibutyl phosphite, dioctyl phosphite, diphenyl isodecyl phosphite, tricresyl phosphite, triphenyl phosphite, tris (nonylphenyl) phosphite, and triisooctyl phosphite.

In the present invention, a single type or a combination of two or more types of the stabilizer may be used. The content is selected in the range of 0.5 to 10 parts by weight per 100 parts by weight of the vinyl chloride resin of component (A). When the content is less than 0.5 parts by weight, the effect of increasing heat stability is not sufficiently exhibited. When the content is more than 10 parts by weight, the effect is not exhibited to the degree expected from the used amount, and the amount is economically disadvantageous. In view of the heat stability and the economy, the content is preferably in the range of 1 to 8 parts by weight, more preferably 2 to 6 parts by weight, per 100 parts by weight of the vinyl chloride resin.

The transparent brittle film of the present invention is prepared from the resin composition comprising components (A), (B), (C), (D), and (E) described above. To this resin composition, various additives, such as antioxidants, ultraviolet light absorbents, light stabilizers, antistatic agents, flame retardants, and coloring agents, may suitably be added where desired within the range that the object of the present invention is not adversely affected.

The thickness of the transparent brittle film of the present invention is generally in the range of 20 to 100 $\mu$m. When the thickness is less than 20 $\mu$m, the film is too easily torn to cause decrease in the property for handling. When the thickness is more than 100 $\mu$m, the transparency and the flatness deteriorate, and the cost increases. In view of the property for handling, the transparency, the flatness, and the economy, the thickness is preferably in the range of 35 to 80 $\mu$m.

It is preferred that the film of the present invention has a light transmittance of 20% or more in the range of wave length of 300 to 700 nm and a tearing strength in the range of 3.0 to 20.0 g. When the light transmittance is less than 20%, the transparency is not sufficient, and such a light transmittance is not preferable. When the tearing strength is less than 3.0 g, the film is too easily torn to cause difficulty in handling. When the tearing strength is more than 20.0 g, the brittleness is decreased. Thus, such tearing strengths are not preferable. In view of the balance between the property for handling and the brittleness, the tearing strength is preferably in the range of 5.0 to 17.0 g. The above light transmittance is obtained by the measurement using the computer color matching (CCM). For the measurement of the tearing strength, a sample is conditioned by being left standing at 22° to 25° C. for 1 hour or more. Ten sheets of the conditioned sample having a size of 50×100 mm were laid to form a laminate, and the Elemendorf tearing test was repeated with the laminate 6 times in accordance with the method of Japanese Industrial Standard K 7128. From the results obtained by the test, the average value of the tearing strengths was obtained, and 1/10 of the obtained value was used as the tearing strength of the sample.

It is preferred that the film of the present invention has a tensile strength at break in the range of 1.0 to 3.0 kg/mm$^2$ and an elongation at break in the range of 2.0 to 10.0%. When the tensile strength at break is less than 1.0 kg/mm$^2$, the strength is excessively small to cause decrease in the property for handling. When the tensile strength is more than 3.0 kg/mm$^2$, the film is excessively hard to cause inferior fitting for attaching to curved surfaces. Thus, such tensile strengths are not preferable. In view of the property for handling and the fitting for attaching to curved surfaces, the tensile strength at break is more preferably in the range of 1.5 to 2.5 kg/mm$^2$. When the elongation at break is less than 2.0%, the flexibility is excessively small, and the property for handling is inferior. When the elongation at break is more than 10.0%, the brittleness tends to be decreased. In view of the property for handling and the brittleness, the elongation at break is more preferably 3.0 to 8.0%. For the measurement of the tensile strength at break and the elongation at break, a sample was conditioned by being left standing at 22° to 25° C. for 1 hour or more. The conditioned sample having a long rectangular shape of a size of 20×100 mm was subjected to the test by using an Instron-type tensile tester under the condition of an extension speed of 5 mm/minute, a chart speed of 100 mm/minute, and a distance between chucks of 50 mm. The test was repeated 6 times, and the values of the tensile strength and the elongation were averaged to obtain the tensile strength at break and the elongation at break, respectively.

The process for producing the transparent brittle film of the present invention is not particularly limited. The film can be produced by film formation using, for example, any of the casting process, the extrusion process, the calendering process, or the organosol coating process. Among these processes, the organosol coating process is preferable in view of the productivity and the quality of the produced film.

In the organosol coating process, a homogeneous organosol is prepared by thoroughly mixing a suitable solvent, component (A), component (B), component (C), component (D), and component (E) which are described above, and the various additives used where necessary. A support, such as a processing paper and polyethylene terephthalate film having the releasing property, is coated with the prepared mixture to a prescribed thickness, and a film is prepared by drying the film to form a gel. As the solvent used for the above preparation, a poor solvent which does not dissolve the resin of component (A) and has a boiling point of 80° to 200° C. is preferable. Examples of the poor solvent include aromatic hydrocarbons, such as toluene, xylene, ethylbenzene, and trimethylbenzene; cellosolve solvents, such as butyl glycol ether; ketones, such as diisobutyl ketone and cyclohexanone; esters, such as ethyl acetate and butyl acetate; solvent naphtha; and mineral spirit. A single type or a combination of two or more types of the poor solvent may be used. The amount of the poor solvent used in the organosol coating process is generally 100 to 400 parts by weight, preferably 150 to 300 parts by weight, per 100 parts by weight of the vinyl chloride resin of component (A).

To summarized the advantages of the present invention, the transparent brittle film of the present invention is brittle, easily torn, and transparent, has a suitable degree of flexibility and hardness, and can be produced inexpensively and easily. The film is advantageously used for application as labels and stickers, such as certificate stamps and sealing labels, and display stickers, such as marks for danger prevention and marks for commercial products. The film is particularly advantageously used as labels which must be prevented from transfer, such as labels for theft prevention and labels of certificate stamps.

The present invention is described in more detail with reference to examples in the following.

For evaluation of the quality of the obtained film, the light transmittance (300 to 700 nm), the tearing strength, the tensile strength at break, and the elongation at break were obtained in accordance with the methods described in the above. The thickness was also measured.

EXAMPLE 1

Polyvinyl chloride (a product of NIPPON ZEON Co., Ltd.; ZEON 61A) in an amount of 100 parts by weight, 43 parts by weight of a copolymer of methyl methacrylate and methyl acrylate (a product of MITSUBISHI RAYON Co., Ltd.; ACRYPET MD), 24 parts by weight of a polyester plasticizer (a product of ASAHI DENKA Co., Ltd.; PN350), 6 parts by weight of a Ba-Zn stabilizer (a product of ASAHI DENKA Co., Ltd.; AC303), 130 parts by weight of fused silica (a product of DENKI KAGAKU Co., Ltd.; FB-10S; the average diameter, 10 $\mu$m; and the range of particle diameters, 1 to 64 $\mu$m), 4 parts by weight of an ultraviolet absorbent (a product of ASAHI DENKA Co., Ltd.; MARK 1413), 23 parts by weight of butyl glycol ether (a product of MITSUBISHI KAGAKU Co., Ltd.; BG), 23 parts by weight of an aromatic solvent (a product of EXXON KAGAKU Co., Ltd.; SOLVESSO #150), and 94 parts by weight of toluene were mixed together and thoroughly dispersed to prepare an organosol having a solid concentration of 68.7% by weight.

Then, a polyethylene terephthalate film used as the supporter is coated with the organosol prepared in the above, and the solvent was vaporized by heating at 120° C. to form a gel. Thus, a transparent brittle film having a thickness of 52 m was prepared. The quality of this film is shown in Table 1.

EXAMPLES 2 to 5 AND COMPARATIVE EXAMPLES 1 AND 2

Organosols having the compositions shown in Table 1 were prepared by the same procedures as those in Example 1, and transparent brittle films were prepared from these organosols. The qualities of these films are shown in Tables 1 and 2.

COMPARATIVE EXAMPLES 3 AND 4

Organosols having the compositions shown in Table 2 were prepared by the same procedures as those in Example 1 by using two types of fused silica which are fused silica (a) (the average particle diameter, 4.5 $\mu$m; and the range of particle diameters, 0.5 to 18 $\mu$m) and fused silica (b) (the average particle diameter, 12.5 $\mu$m; and the range of particle diameters, 1 to 192 $\mu$m) as the fused silica, and transparent brittle films were prepared from these organosols. The qualities of these films are shown in Table 2.

TABLE 1

|  | Example 1 | Example 2 | Example 3 | Example 4 | Example 5 |
|---|---|---|---|---|---|
| composition of organosol (part by wt.) |  |  |  |  |  |
| ZEON 61A[1] | 100 | 100 | 100 | 100 | 100 |
| ACRYPET MD[2] | 43 | 100 | 100 | 100 | 100 |
| PN 350[3] | 24 | 20 | 20 | 20 | 20 |
| AC 303[4] | 6 | 4 | 4 | 4 | 4 |
| filler |  |  |  |  |  |
| type | FB-10S[8] | FB-10S | FB-10S | BaSO4[9] | Al(OH)3[10] |
| amount | 130 | 200 | 80 | 80 | 80 |
| MARK 1413[5] | 4 | 6 | 6 | 6 | 6 |
| BG[6] | 23 | 24 | 32 | 32 | 32 |
| SOLVESSO #150[7] | 23 | 24 | 32 | 32 | 32 |
| toluene | 94 | 220 | 234 | 234 | 234 |
| solid concentration in organosol (% by wt.) | 68.7 | 61.6 | 51.0 | 51.0 | 51.0 |
| quality of the film |  |  |  |  |  |
| thickness ($\mu$m) | 52 | 50 | 48 | 47 | 51 |
| light transmittance (%) | 27–38 | 25–35 | 28–51 | 20–35 | 22–35 |
| tearing strength (g) | 12 | 8 | 9.3 | 16.7 | 12.7 |
| tensile strength at | 1.92 | 1.70 | 2.64 | 2.82 | 2.25 |

TABLE 1-continued

|  | Example 1 | Example 2 | Example 3 | Example 4 | Example 5 |
|---|---|---|---|---|---|
| break (kg/mm$^2$) |  |  |  |  |  |
| elongation at break (%) | 8 | 5.3 | 5.2 | 9.1 | 6.9 |
| observed condition | — | — | — | — | — |

TABLE 2

|  | Comparative Example 1 | Comparative Example 2 | Comparative Example 3 | Comparative Example 4 |
|---|---|---|---|---|
| composition of organosol (part by wt.) |  |  |  |  |
| ZEON 61A[1] | 100 | 100 | 100 | 100 |
| ACRYPET MD[2] | — | 100 | 100 | 100 |
| PN 350[3] | 25 | 20 | 20 | 20 |
| AC 303[4] | 4 | 4 | 6 | 6 |
| filler |  |  |  |  |
| type | FB-10S | — | fused silica (a)[11] | fused silica (b)[12] |
| amount | 90 | — | 120 | 120 |
| MARK 1413[5] | 3 | 6 | 6 | 6 |
| BG[6] | 24 | 32 | 28 | 28 |
| SOLVESSO #150[7] | 24 | 32 | 28 | 28 |
| toluene | — | 234 | 234 | 234 |
| solid concentration in organosol (% by wt.) | 82.2 | 43.6 | 54.8 | 54.8 |
| quality of the film |  |  |  |  |
| thickness (μm) | 62 | 52 | 47 | 55 |
| light transmittance (%) | — | 32–63 | 10–13 | 27–38 |
| tearing strength (g) | 15 | 25.6 | 14.8 | 5.0 |
| tensile strength at break (kg/mm$^2$) | 1.57 | 2.79 | 2.72 | 1.57 |
| elongation at break (%) | 64 | 14.0 | 1.50 | 3.20 |
| observed condition | crack formed | — | poor dispersion, thixotropy, high viscosity | poor dispersion, poor smoothness of the surface of film |

Notes for Tables 1 and 2:
1) ZEON 61A: polyvinyl chloride; a product of NIPPON ZEON Co., Ltd.
2) ACRYPET MD: a copolymer of methyl methacrylate and methyl acrylate; a product of MITSUBISHI RAYON Co., Ltd.
3) PN 350: a polyester plasticizer; a product of ASAHI DENKA Co., Ltd.
4) AC 303: a Ba-Zn stabilizer; a product of ASAHI DENKA Co., Ltd.
5) MARK 1413: an ultraviolet light absorbent; a product of ASAHI DENKA Co., Ltd.
6) BG: butyl glycol ether; a product of MITSUBISHI KAGAKU Co., Ltd.
7) SOLVESSO #150: an aromatic solvent; a product of EXXON KAGAKU Co., Ltd.
8) FB-10S: fused silica; a product of DENKI KAGAKU Co., Ltd.; the average particle diameter, 10 μm; and the range of particle diameters, 1 to 64 μm.
9) BaSO$_4$: a product of SAKAI KAGAKU KOGYO Co., Ltd.; the average particle diameter, 3.5 μm; and the range of particle diameters, 2 to 6 μm.
10) Al(OH)$_3$: a product of SHOWA DENKO Co., Ltd.; H-32; the average particle diameter, 15 μm; and the range of particle diameters, 3 to 20 μm.
11) fused silica (a): the average particle diameter, 4.5 μm; and the range of particle diameters, 0.5 to 18 μm.
12) fused silica (b): the average particle diameter, 12.5 μm; and the range of particle diameters, 1 to 192 μm.

As can be understood from Tables 1 and 2, the transparent brittle films of the present invention prepared in the examples were all transparent, brittle, and easily torn and had a suitable degree of flexibility. In contrast, the film obtained in Comparative Example 1 which did not contain an acrylic resin showed the formation of crack in the film and had no value as a commercial product. The film obtained in Comparative Example 2 which did not contain a filler had a large tearing strength to result in inferior brittleness and a large elongation at break although the film showed excellent transparency. Fused silica (a) used in Comparative Example 3 had a smaller average particle diameter than the range specified in the present invention and a relatively sharp distribution of the particle diameter. In Comparative Example 3, the organosol showed inferior dispersion and a high viscosity along with strong thixotropy, and the obtained film had poor transparency. Fused silica (b) used in Comparative Example 4 contained particles having larger individual particle diameters than the range specified in the present invention although the average diameter was within the range specified in the present invention. In Comparative Example 4, the organosol showed inferior dispersion, and the surface of the obtained film was inferior in the smoothness and coarse.

EXAMPLE 6

A transparent brittle film was prepared by the same procedures as those in Example 3 except that polymethyl methacrylate (a product of MITSUBISHI RAYON Co., Ltd.; ACRYPET VH) was used in place of ACRYPET MD. The following quality of the film was obtained: a thickness of 44 μm; a light transmittance of 22 to 37%; a tearing strength of 10.3 g; a tensile strength at break of 2.34 kg/mm$^2$; and an elongation at break of 4.5%.

What is claimed is:

1. A transparent brittle film prepared from a resin composition comprising (A) 100 parts by weight of a vinyl chloride resin, (B) 20 to 200 parts by weight of an acrylic resin, (C) 20 to 250 parts by weight of at least one type of filler selected from the group consisting of (a) fused silica comprising aggregates of particles having an average particle diameter in the range of 5 to 20 μm and individual particle diameters in the range of 0.5 to 100 μm, (b) aluminum hydroxide comprising aggregates of particles having an average particle diameter in the range of 1 to 20 μm and individual particle diameters in the range of 0.2 to 50 μm, and (c) barium sulfate comprising aggregates of particles having an average particle diameter in the range of 1 to 20 μm and individual particle diameters in the range of 0.2 to 50 μm, (D) 0 to 40 parts by weight of a plasticizer, and (E) 0.5 to 10 parts by weight of a stabilizer; and
wherein the film has a light transmittance of 20% or more in a range of wave length of 300 to 700 nm and a tensile strength at break of 1.0 to 3.0 kg/mm$^2$.

2. A transparent brittle film according to claim 1 wherein the film has a tearing strength of 3.0 to 20.0 g.

3. A transparent brittle film according to claim 2 wherein the film has a tensile strength at break of 1.0 to 3.0 kg/mm$^2$ and an elongation at break of 2.0 to 10.0%.

4. A transparent brittle film according to claim 3 wherein the film is prepared in accordance with an organosol coating process.

5. A transparent brittle film according to claim 2 wherein the film has a thickness of 20 to 100 μm.

6. A transparent brittle film according to claim 2 wherein the film is prepared in accordance with an organosol coating process.

7. A transparent brittle film according to claim 1 wherein the film has an elongation at break of 2.0 to 10.0%.

8. A transparent brittle film according to claim 7 wherein the film has a thickness of 20 to 100 μm.

9. A transparent brittle film according to claim 7 wherein the film is prepared in accordance with an organosol coating process.

10. A transparent brittle film according to claim 1 wherein the film has a thickness of 20 to 100 μm.

11. A transparent brittle film according to claim 1 wherein the film is prepared in accordance with an organosol coating process.

12. A process for producing a transparent brittle film having a light transmission of 20% or more in a range of wave length of 300 to 700 nm and a tensile strength at break of 1.0 to 3.0 kg/mm$^2$, which comprises preparing a homogeneous organosol by thoroughly mixing (A) 10 parts by weight of a vinyl chloride resin, (B) 20 to 200 parts by weight of an acrylic resin, (C) 20 to 250 parts by weight of at least one type of filler selected from the group consisting of (a) fused silica comprising aggregates of particles having an average particle diameter in the range of 5 to 20 μm and individual particle diameters in the range of 0.5 to 100 μm, (b) aluminum hydroxide comprising aggregates of particles having an average particle diameter in the range of 1 to 20 μm and individual particle diameters in the range of 0.2 to 50 μm, and (c) barium sulfate comprising aggregates of particles having an average particle diameter in the range of 1 to 20 μm and individual particle diameters in the range of 0.2 to 50 μm, (D) 0 to 40 parts by weight of a plasticizer, (E) 0.5 to 10 parts by weight of a stabilizer, and (F) 100 to 400 parts by weight of a poor solvent, coating a support with the prepared mixture, and drying a film to form a gel.

13. A process for producing a transparent brittle film according to claim 12 wherein the film has a tearing strength of 3.0 to 20.0.

14. A process for producing a transparent brittle film according to claim 12 wherein the film has an elongation at break of 2.0 to 10.0%.

15. A process for producing a transparent brittle film according to claim 12 wherein the film has a thickness of 20 to 100 μm.

* * * * *